(No Model.)

D. S. SPERRY & G. R. HANNUM.
SAP BUCKET COVER.

No. 524,356. Patented Aug. 14, 1894.

Witnesses:
W. S. Austin
F. G. Hannum

Inventor:
Daniel S. Sperry
George R. Hannum

UNITED STATES PATENT OFFICE.

DANIEL SMITH SPERRY AND GEORGE RANDALL HANNUM, OF HUNTSBURG, OHIO.

SAP-BUCKET COVER.

SPECIFICATION forming part of Letters Patent No. 524,356, dated August 14, 1894.

Application filed April 14, 1892. Serial No. 429,231. (No model.)

*To all whom it may concern:*

Be it known that we, DANIEL SMITH SPERRY and GEORGE RANDALL HANNUM, citizens of the United States, and residents of Huntsburg, in the county of Geauga and State of Ohio, have invented certain new and useful Improvements in Sap-Bucket Covers, for Keeping Out Rain and Snow, of which the following is a specification.

This invention relates to a new device for fastening covers on sap buckets, and consists of certain new and useful features of construction and combinations of parts hereinafter described and pointed out in the claims.

Figure 1:
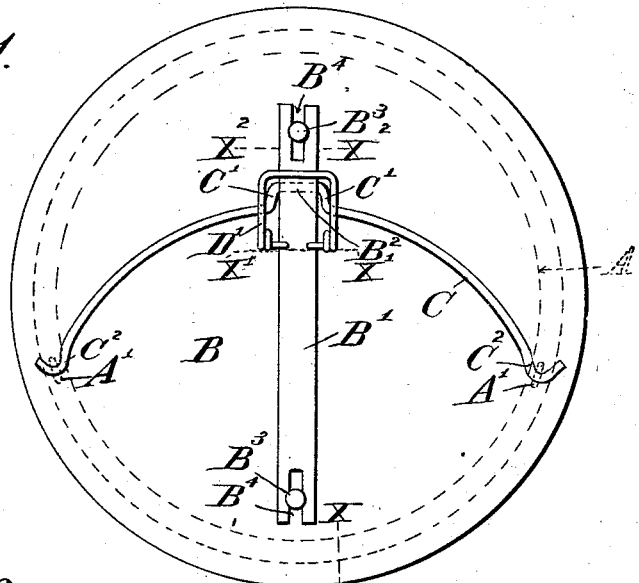
Figure 2:
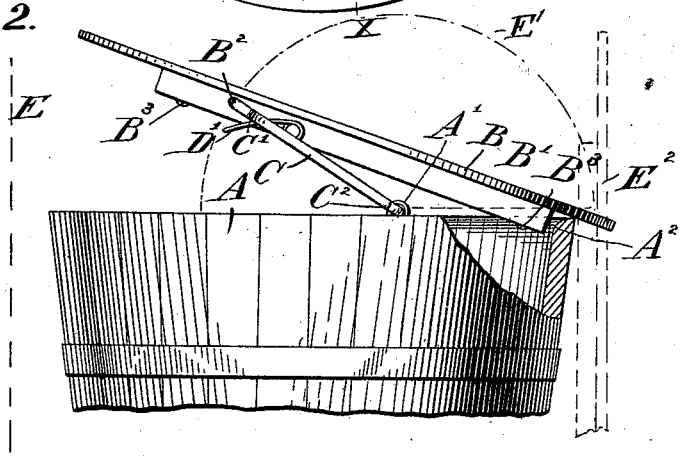
Figure 3:
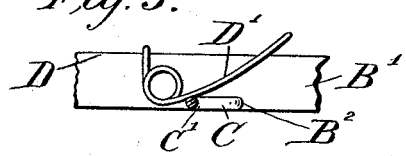
Figure 4:

Referring to the accompanying drawings which form part of this specification, Figure 1 is a plan view of the under side of a wooden cover provided with our improvements. Fig. 2 is a view of the bucket and cover partially in elevation and partially in vertical section, at the dotted line X—X Fig. 1. Fig. 3 is an elevation of the cleat B' between the dotted lines X' X' and $X^2 X^2$ Fig. 1. Fig. 4 is a view in vertical section at the dotted line X' X' Fig. 1.

Like letters of reference indicate corresponding parts throughout the several views.

A is a sap bucket.

B is a wooden cover.

C is a bail hinged to the cover B by passing through a notch or groove in the cleat B' at $B^2$ and hinged to the bucket A by passing through the staples A'. It will be observed that the bends in the bail C at C' and $C^2$ prevent the bail from working endwise at $B^2$ and A'.

B' is an adjustable cleat fastened to the cover B by the screws $B^3$ $B^3$ passing through the slots $B^4$ $B^4$ which permits the cover to be readily adjusted to different sized buckets and will allow the cover to be thrown farther toward or away from the tree. The cleat B' also forms a lock as shown at $A^2$ Fig. 2, which tends to prevent the cover from blowing open.

The cleat B' may be made of metal or wood.

D is a wire spring fastened to the cleat B' at the dotted line X' X' Fig. 1, as shown in Fig. 4, and passing over the bail C at the bend C' C' as shown by Figs. 1 and 3 which prevents the wind from raising the lock out of position at $A^2$ Fig. 2.

The dotted line E Fig. 2 shows the position of the tree.

To open the bucket raise the cover until the cleat B' is above the edge of the bucket at $A^2$, then swing it out as shown by the dotted lines E' and $E^2$ Fig. 2.

To remove the cover from the bucket spring the bail C until the hooks at the ends of the bail pass out of the staples A' A'.

The advantages of our cover fastening attachment are first that wood or tin covers square or round can be used on wood or tin sap buckets. Second. It opens away from the tree as shown by the dotted lines E E' and $E^2$ Fig. 2. Third. Buckets may be left open in pleasant weather, or opened to wash the buckets, or to break ice without removing the covers from the buckets.

We claim—

1. The combination in a sapbucket cover of a swinging bail C, and an adjustable cleat secured to said cover, provided with a groove adapted to carry said bail, and provided with adjusting slots, adapted to admit the fastening screws $B^3$ $B^3$, and the spring D, fastened to said cleat in a position to bear on said bail, all substantially as described.

2. In combination with a sapbucket cover of the swinging bail C and the adjustable cleat secured to said cover, provided with a groove adapted to carry said bail, and the spring D fastened to said cleat in a position to bear on said bail, substantially as specified.

Signed at Huntsburg, in the county of Geauga and State of Ohio, this 11th day of April, A. D. 1892.

DANIEL SMITH SPERRY.
GEORGE RANDALL HANNUM.

Witnesses:
ERNEST H. PERRY,
HARRY T. CLARK.